(12) United States Patent
Guo et al.

(10) Patent No.: US 10,104,367 B2
(45) Date of Patent: Oct. 16, 2018

(54) 3D DISPLAY DEVICE AND ITS DRIVING METHOD AND DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Renwei Guo, Beijing (CN); Xue Dong, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 15/308,045

(22) PCT Filed: Feb. 16, 2016

(86) PCT No.: PCT/CN2016/073872
§ 371 (c)(1),
(2) Date: Oct. 31, 2016

(87) PCT Pub. No.: WO2017/036097
PCT Pub. Date: Mar. 9, 2017

(65) Prior Publication Data
US 2017/0272734 A1    Sep. 21, 2017

(30) Foreign Application Priority Data

Sep. 2, 2015 (CN) .......................... 2015 1 0556849

(51) Int. Cl.
*H04N 13/32* (2018.01)
*H04N 13/04* (2006.01)
(Continued)

(52) U.S. Cl.
CPC .............. *H04N 13/32* (2018.05); *G09G 3/001* (2013.01); *H04N 13/0418* (2013.01);
(Continued)

(58) Field of Classification Search
CPC combination set(s) only.
See application file for complete search history.

(56) References Cited

U.S. PATENT DOCUMENTS 8,724,040 B2* 5/2014 Sumi ................... H04N 13/0404
349/139
9,691,354 B2* 6/2017 Guo .......................... G09G 3/36
(Continued)

FOREIGN PATENT DOCUMENTS

CN     101452118 A    6/2009
CN     202720395      2/2013
(Continued)

OTHER PUBLICATIONS

International Search Report for PCT/CN2016/073872 dated Jun. 12, 2016.
(Continued)

*Primary Examiner* — Priyank Shah
(74) *Attorney, Agent, or Firm* — Calfee, Halter & Griswold LLP (57) ABSTRACT

The invention relates to a display device, and discloses a 3D display device and its driving method and device. The display device comprises a pixel array and a raster, the pixel array comprises multiple columns of sub-pixel groups, each column of sub-pixel groups comprises M*N sub-pixels, wherein M is the number of color categories, and N is a positive integer greater than 3; each sub-pixel has a rectangular shape, and the odd columns of sub-pixel groups and the even columns of sub-pixel groups are set staggerly; the display device comprises multiple occluding rectangles
(Continued)

arranged in a regular array, wherein occluding rectangles in neighboring columns are set staggerly in the column direction, and occluding rectangles in columns separated by a column are symmetrically set relative to the column between them in the row direction.

13 Claims, 9 Drawing Sheets

(51) Int. Cl.
  *G09G 3/00* (2006.01)
  *H04N 13/324* (2018.01)
  *H04N 13/349* (2018.01)

(52) U.S. Cl.
  CPC ..... *H04N 13/0422* (2013.01); *H04N 13/0445* (2013.01); *H04N 13/324* (2018.05); *H04N 13/349* (2018.05); *G09G 2300/0443* (2013.01); *G09G 2360/147* (2013.01)

(56) References Cited

U.S. PATENT DOCUMENTS

| | | | |
|---|---|---|---|
| 9,728,111 B2* | 8/2017 | Guo | G09G 3/003 |
| 9,779,649 B2* | 10/2017 | Guo | G09G 3/2003 |
| 2005/0083246 A1* | 4/2005 | Saishu | G02B 27/0025 345/1.1 |
| 2005/0225502 A1* | 10/2005 | Nam | H04N 13/31 345/55 |
| 2006/0139234 A1* | 6/2006 | Tanaka | H04N 13/31 345/9 |
| 2008/0278639 A1* | 11/2008 | Hamagishi | G02B 27/2214 349/8 |
| 2009/0141122 A1 | 6/2009 | Hong | |
| 2011/0228185 A1* | 9/2011 | Hamagishi | G02B 27/2214 349/15 |
| 2011/0234582 A1* | 9/2011 | Daiku | G02B 27/2214 345/419 |
| 2011/0234929 A1* | 9/2011 | Lin | G02B 27/2214 349/15 |
| 2011/0291549 A1 | 12/2011 | Kim et al. | |
| 2012/0086708 A1* | 4/2012 | Lin | G09G 3/003 345/419 |
| 2012/0206503 A1* | 8/2012 | Hirakata | H04N 13/0409 345/690 |
| 2012/0223941 A1* | 9/2012 | Sekine | H04N 13/0422 345/419 |
| 2012/0274890 A1* | 11/2012 | Uehara | H04N 13/0409 349/144 |
| 2014/0029095 A1* | 1/2014 | Allio | H04N 13/0404 359/464 |
| 2014/0085439 A1* | 3/2014 | Niwano | H04N 13/0413 348/56 |
| 2014/0210954 A1* | 7/2014 | Takahashi | H01L 27/14621 348/49 |
| 2015/0309319 A1* | 10/2015 | Wei | G02B 27/2214 359/463 |
| 2016/0232825 A1* | 8/2016 | Zhao | G09G 3/003 |
| 2016/0234488 A1* | 8/2016 | Zhao | H04N 13/0422 |
| 2016/0275844 A1* | 9/2016 | Guo | G09G 3/003 |
| 2016/0277722 A1* | 9/2016 | Guo | H04N 13/0422 |
| 2016/0360191 A1* | 12/2016 | Yang | G02B 27/2214 |
| 2016/0379533 A1* | 12/2016 | Guo | G09G 3/20 345/694 |
| 2016/0379540 A1* | 12/2016 | Guo | H04N 13/0409 345/694 |
| 2017/0004756 A1* | 1/2017 | Guo | G09G 3/2074 |
| 2017/0038625 A1* | 2/2017 | Lu | G02F 1/29 |
| 2017/0038649 A1* | 2/2017 | Lu | G02F 1/29 |
| 2017/0039911 A1* | 2/2017 | Guo | G02F 1/1362 |
| 2017/0039913 A1* | 2/2017 | Guo | G09G 3/003 |
| 2017/0163974 A1* | 6/2017 | Guo | H04N 13/0404 |
| 2017/0230643 A1* | 8/2017 | Guo | H04N 13/0418 |

FOREIGN PATENT DOCUMENTS

| | | |
|---|---|---|
| CN | 104599625 | 5/2015 |
| CN | 104599626 | 5/2015 |
| CN | 104599626 A | 5/2015 |
| CN | 104614863 | 5/2015 |
| CN | 104680949 | 6/2015 |
| CN | 104681001 | 6/2015 |
| CN | 104766548 | 7/2015 |
| CN | 105093550 | 11/2015 |
| JP | 2002182153 | 6/2002 |
| JP | 2012233990 A | 11/2012 |
| KR | 100597584 | 7/2006 |

OTHER PUBLICATIONS

Office Action from China Application No. 2015105568491 dated Jan. 4, 2017.
Second Office Action from China Application No. 201510556849.1 dated Aug. 29, 2017.
Notification of Reason for Refusal for Korean Patent Application No. 10-2017-7001155 dated Apr. 6, 2018.
Text of Third Office Action for Chinese Patent Application No. 201510556849.1 dated Mar. 19, 2018.

* cited by examiner

Sub-pixel located
in a joint region    12

3D DISPLAY DEVICE AND ITS DRIVING METHOD AND DEVICE

RELATED APPLICATIONS

The present application is the U.S. national phase entry of PCT/CN2016/073872, with an international filing date of Feb. 16, 2016, which claims the benefit of Chinese Patent Application No. 201510556849.1, filed on Sep. 2, 2015, the entire disclosures of which are incorporated herein by reference.

TECHNICAL FIELD

The invention relates to the technical field of display devices, and in particular, to a 3D display device and its driving method.

BACKGROUND OF THE INVENTION

Naked eye 3D (3 dimension) is also a form of 3D, it differentiates between information entering the left and right eyes of a person by a raster, such that the person perceives a 3D effect, and is applied widely on large sized TVs. However, because the naked eye 3D has a light occluding raster design, the PPI (Pixels Per Inch) reduces much in the process of observation, sometimes half of the PPI will be reduced, such that the viewed 3D effect is lowered.

The virtual display technology is very widely applied in the current display field, and by making pixels commonly used, it can cause the visual resolution to be higher than the physical resolution of the panel. Nowadays, South Korea's Samsung is the panel maker who most uses the virtual display technology. However, since when OLEDs (Organic Light-Emitting Diodes) are taken as sub-pixels, the difficulty in the process of forming resin patterns is great, and therefore bottlenecks are encountered in manufacturing display screens with a high PPI. This problem can be well solved by a virtual technique, which improves the screen resolution perceived by human eyes. Such a virtual algorithm technique is named as the pentile technique, which is monopolized by Samsung and is applied on Samsung's high-end products such as S3, S4, etc. The arrangement pattern of the S4 mode is a diamond-shaped arrangement. From the perspective of the current newest techniques, such an arrangement breaks through the traditional mode of one row and alternatively one column RGB arrangement, such a display approach can only use the virtual technology in which pixels are commonly used for display, and what is rarest is that the display effect of such an arrangement for display is very good, and it is worthy of our reference.

How to combine the naked eye 3D technology with the virtual display technology to produce high definition 3D is a challenge, and combination of 3D display and a virtual algorithm is less introduced in current related documents and patents.

SUMMARY

The invention provides a 3D display device and its driving method for improving the 3D display effect of the 3D display device.

The invention provides a 3D display device which comprises a pixel array and a raster, the pixel array comprising multiple columns of sub-pixel groups, each column of sub-pixel groups comprising M*N sub-pixels, wherein M is the number of color categories of the sub-pixels, and N is a positive integer greater than 3, wherein each sub-pixel has a rectangular shape, and the odd columns of sub-pixel groups and the even columns of sub-pixel groups are set staggerly.

The raster comprising multiple occluding rectangles arranged in a regular array, each occluding rectangle being used for occluding at least one sub-pixel in the column direction; wherein occluding rectangles in neighboring columns are set staggerly in the column direction, and occluding rectangles in columns separated by a column are symmetrically set relative to the column between them in the row direction.

The width with which the odd columns of sub-pixel groups and the even columns of sub-pixel groups are set staggerly is half the width of the sub-pixels in the column direction, and the width with which occluding rectangles in neighboring columns are set staggerly in the column direction is half the width of the sub-pixels in the column direction. The particular stagger relationship.

Preferably, the width of the occluding rectangles in the column direction is 7/2 times the width of the sub-pixel units in the column direction, and the width of them in the row direction is the width of a single sub-pixel.

Preferably, M is 3, and the colors of the sub-pixels are red, green and blue.

Preferably, the pixel array is a triangle array.

Preferably, in each column of sub-pixel groups, every M sub-pixels are a view unit sequentially from the beginning, and neighboring view units correspond to different views in the 3D display.

The invention further provides a driving method for a 3D display device, which 3D display device is a 3D display device as claimed in any of the above, the method comprising: color components of individual colors in each view unit, and for each sub-pixel of each view, determining the luminous brightness of the sub-pixel according to the color components of the color of the sub-pixel in individual view units covered by a rectangular sampling region corresponding to the sub-pixel and belonging to the view.

Preferably, when a sub-pixel located in a region where occluding rectangles are overlapped in the column direction is displayed, it is replaced with a sub-pixel in a neighboring column of sub-pixel groups for display, which is located outside the region where occluding rectangles are overlapped in the column direction, closest to it, used for displaying the same view as it and has the same color as it.

Preferably, when a sub-pixel which is not located in a region where occluding rectangles are overlapped in the column direction is displayed, the sampling region is a rectangular sampling region, the sampling region takes the centerline of the corresponding sub-pixel in the column direction as the centerline of the sampling region in the column direction, the width of the sampling region in the row direction is two times that of the sub-pixel in the row direction, and its width in the column direction is three times that of the sub-pixel in the column direction, wherein, the sampling region corresponding to each sub-pixel covers a part of a sub-pixel located under the sub-pixel corresponding to the sampling region in the column direction, and for sub-pixels in odd columns, the sampling region corresponding to each sub-pixel joins the sampling region corresponding to a sub-pixel in an even column in the column direction, and the positions of it and the sampling region corresponding to the sub-pixel in the even column are stagger in the row direction.

Preferably, for sub-pixels in even columns, the sampling region corresponding to each sub-pixel covers a part of a sub-pixel located under the sub-pixel corresponding to the sampling region in the column direction, which part is between 0 and ½ times the length of the sub-pixel in the column direction.

Preferably, in a column of sub-pixels neighboring to the sub-pixel located in the region where occluding rectangles are overlapped in the column direction, sub-pixels are sought which are located outside the region where occluding rectangles are overlapped in the column direction, display the same view and have the same color as the sub-pixel; in the found sub-pixels, a sub-pixel closest to the sub-pixel located in the region where occluding rectangles are overlapped in the column direction is used as an alternative sub-pixel, and a sampling region is divided out according to the position of the alternative sub-pixel; the sampling region is a rectangular region, of which the width in the column direction is between 5 times and 6 times the width of the sub-pixel in the column direction, and of which the width in the row direction is 2 times the width of the sub-pixel in the row direction; and in the column direction, both the upper and lower ends of the sampling region corresponding to the alternative sub-pixel cover part of a sub-pixel.

The invention further provides a driving device for a 3D display device, the display device is a display device as described above, and the driving device is configured to drive the 3D display device according to a method mentioned above.

DETAILED DESCRIPTION OF THE INVENTION

Reference Numbers

10 Pixel array
11 Sub-pixel
12 Alternative pixel
20 Raster
21 Occluding rectangle
22 Joint region
30 First view unit
40 Second view unit To improve the naked eye 3D display effect of a 3D display device, embodiments of the invention provide a 3D display device and its driving method. In the technical solution of the invention, by employing the setting of an alien raster and re-planning sampling regions, the effect of a naked eye 3D picture of the 3D display device is thus improved. For the convenience of understanding the technical solution of the invention, in the following, the technical solution of the invention will be described in detail in connection with the drawings and the particular embodiments.

First, it needs to be noted that, for the convenience of description, the column ordinals of the sub-pixels are represented with S1, S2, . . . , S10, the ordinals of the odd columns of sub-pixel groups are represented with R1, R2, . . . , R12, and the ordinals of the even columns of sub-pixels are represented with C1, C2, . . . , C12, and the position of a sub-pixel is represented with a row number and a column number.

Figure 1:
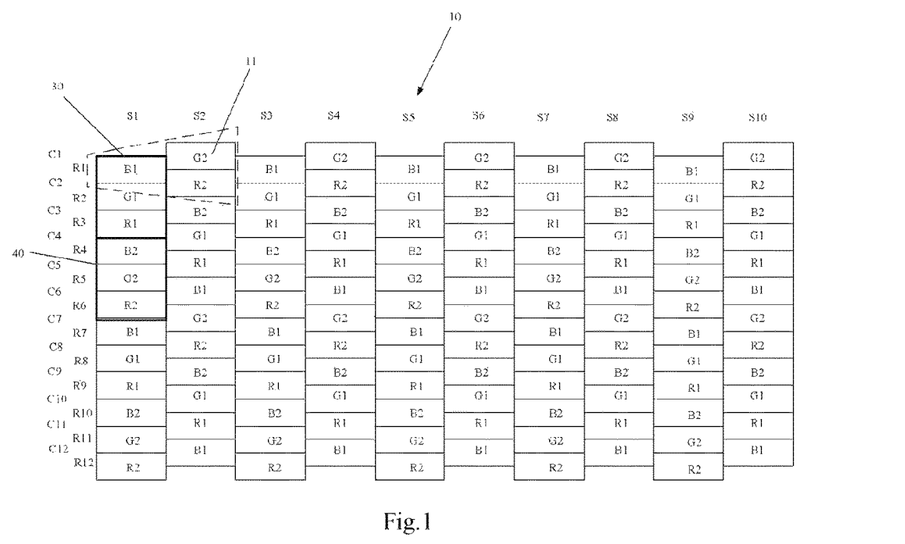
FIG. 1 shows a schematic diagram of an arrangement of a pixel array provided by an embodiment of the invention.
Figure 2:
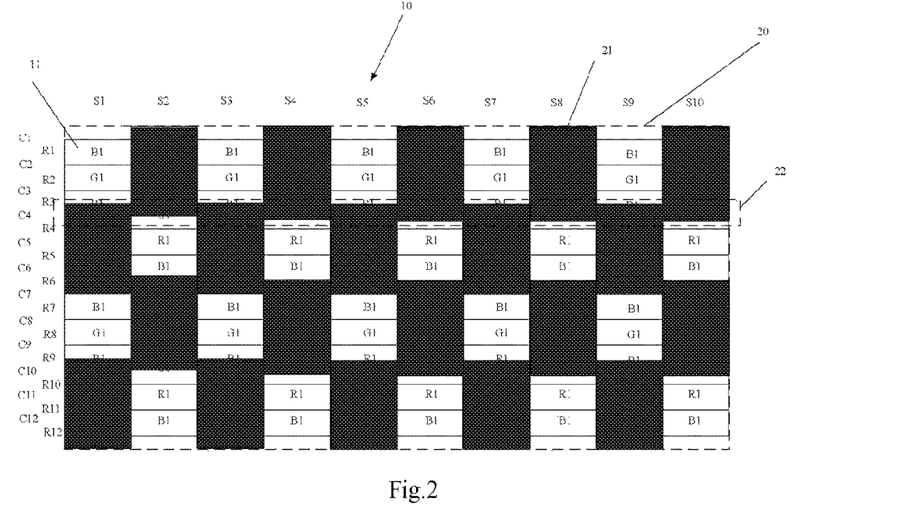
FIG. 2 shows a schematic diagram of a combination of a raster and the pixel array provided by an embodiment of the invention.

With reference to FIG. 1 and FIG. 2 together, FIG. 1 shows a schematic diagram of an arrangement of a pixel array provided by an embodiment of the invention, and FIG. 2 shows a schematic diagram of a combination of a raster and the pixel array provided by an embodiment of the invention.

An embodiment of the invention provides a 3D display device which comprises a pixel array 10 and a raster 20, the pixel array 10 comprising multiple columns of sub-pixel groups, each column of sub-pixel groups comprising M*N sub-pixels 11, wherein M is the number of color categories of the sub-pixels 11, and N is a positive integer greater than 3, wherein each sub-pixel 11 has a rectangular shape, and the odd columns of sub-pixel groups and the even columns of sub-pixel groups are set staggerly.

The raster 20 being similar to the shape of a checkerboard and comprising multiple occluding rectangles 21 arranged in a regular array, each occluding rectangle 21 being used for occluding at least one sub-pixel 11 in the column direction, wherein occluding rectangles 21 in neighboring columns are set staggerly in the column direction, and occluding rectangles in columns separated by a column are symmetrically set relative to the column between them in the row direction, that is, occluding rectangles in neighboring odd columns are symmetrically set relative to the even column between them in the row direction, and occluding rectangles in neighboring even columns are symmetrically set relative to the odd column between them in the row direction.

In the above embodiment, by employing the pixel array 10 set staggerly and in cooperation with the raster 20 at the same time to form occlusion, improvement on the naked eye 3D display effect of the 3D display device is achieved. To facilitate the understanding of the structure and the working principle of the embodiment of the invention, in the following, they will be described in detail in connection with specific drawings and embodiments.

As shown in FIG. 1, which shows an arrangement manner of a pixel array 10 provided by an embodiment of the invention, the pixel array 10 comprised by the 3D display device provided by the embodiment of the invention consists of multiple sub-pixels, and the multiple sub-pixels 11 are arranged in an array manner, in particular, each column of sub-pixel groups comprises M*N sub-pixels 11, wherein M is the number of color categories of the sub-pixels 11, and N is a positive integer greater than 3. In the specific embodiment, M is 3, the colors of the sub-pixels 11 are red, green and blue, i.e., red sub-pixels, green sub-pixels and blue sub-pixels, and in each column of sub-pixel groups, M sub-pixels are a view unit, and neighboring view units correspond to a first view and a second view in the 3D display. That is, when displaying a naked eye 3D picture, neighboring view units in each column of sub-pixel groups display the first view and the second view in the 3D picture signal, respectively. For the convenience of description, a view unit displaying the first view is named as a first view unit 30, a view unit displaying the second view is named as a second view unit 40, and their arrangement manner is as shown in FIG. 1, in which the three sub-pixels 11 in the first view are represented with R1, G1, B1, respectively, and the three sub-pixels 11 in the second view are represented with R2, G2, B2, respectively, and it can be seen from FIG. 1 that, in the pixel array 10, the first view units 30 and the second view units 40 are arranged alternately.

In the pixel array 10 in this application, sub-pixel groups located in an odd column and sub-pixel groups located in an even column are arranged staggerly. As shown in FIG. 1, the stagger manner is such that the height of multiple odd columns of sub-pixel groups is flush, the height of multiple even columns of sub-pixel groups is flush, and the width with which the odd columns of sub-pixel groups and the even columns of sub-pixel groups are set staggerly is half the width of the sub-pixels 11 in the column direction, such that the sub-pixels 11 in the pixel array 10 form a triangle array. That is, as shown in FIG. 1, sub-pixels 11 of three colors R, G, B form a triangular array, and in the figure, three RGB sub-pixels 11 taken on a "Δ" shape.

As shown in FIG. 2, which shows a schematic diagram of a cooperation of the pixel array 10 with a raster 20 provided by an embodiment of the invention, the raster 20 provided by the embodiment is in a checkerboard format, that is, in the raster 20, occluded occluding rectangles 21 and light transmissive rectangles that allow light to pass are arranged staggerly, to form a form similar to a black and white checkerboard. As shown in FIG. 2, what is shown by the larger dashed box is the raster 20; when set specifically, the setting between the occluding rectangles 21 is not flush, that is to say, the positions of two neighboring occluding rectangles 21 in different columns are staggered, namely, there are some parts of two neighboring occluding rectangles 21 in the column direction which are overlapped in the row direction; and as shown in FIG. 2, the smaller dashed box comprises a joint region 22 of the positions of neighboring occluding rectangles 21 in different columns.

It needs to be known that, in embodiments described in this document, the joint region refers to a region where occluding regions are overlapped in the column direction.

Figure 3:
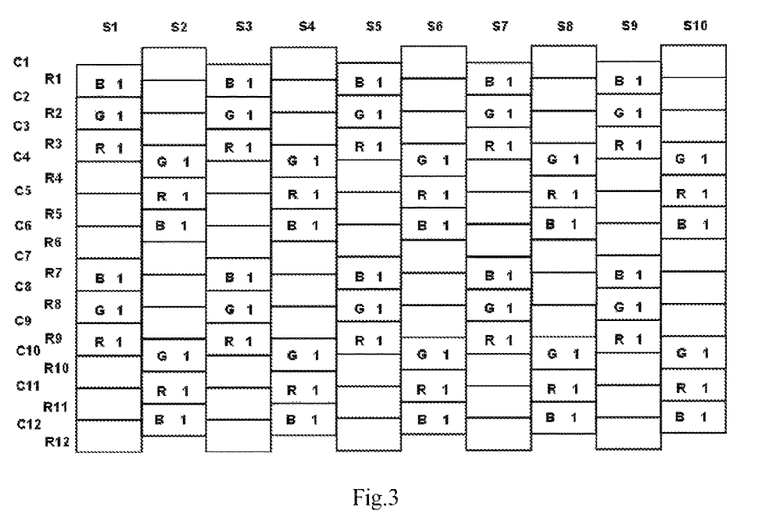
FIG. 3 is view units corresponding to a first view in the pixel array provided by an embodiment of the invention.
Figure 4:
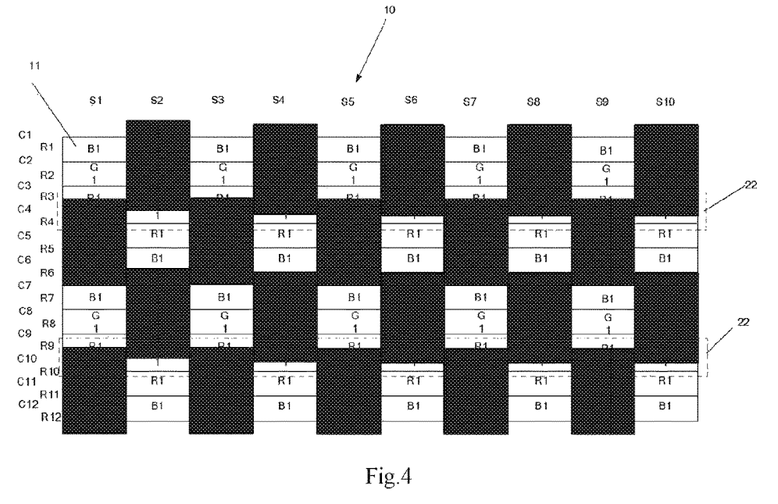
FIG. 4 is a schematic diagram of a cooperation of sub-pixels with the raster corresponding to the first view provided by an embodiment of the invention.
Figure 5:
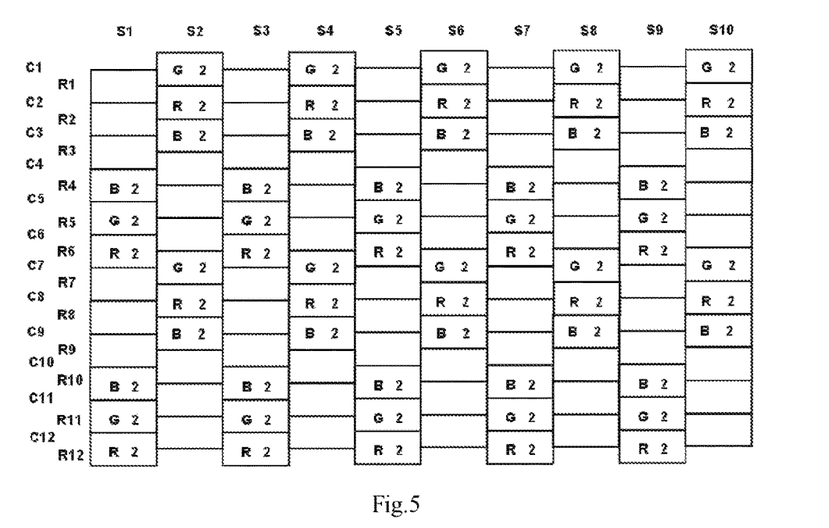
FIG. 5 is view units corresponding to a second view in the pixel array provided by an embodiment of the invention.
Figure 6:
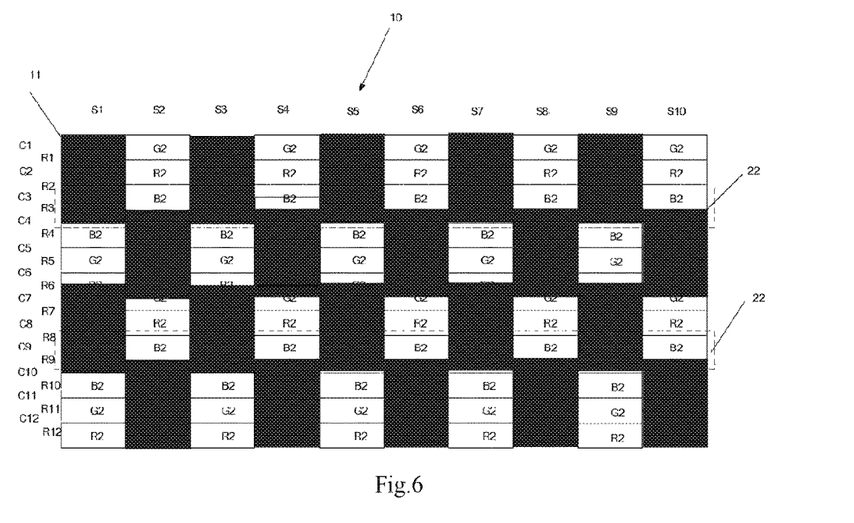
FIG. 6 is a schematic diagram of a cooperation of sub-pixels with the raster corresponding to the second view provided by an embodiment of the invention.

By employing a stagger setting manner, it is caused that in the 3D display signals corresponding to the two views are differentiated in two different eyes, respectively, which reduces the crosstalk phenomenon and improves the display effect. It may be seen from FIG. 2 that the occluding rectangles 21 employ a stagger setting manner, and occlude part of the sub-pixels 11 in display. In particular, the width of the occluding rectangles 21 in the column direction is 7/2 times the width of the sub-pixel 11 units in the column direction, and the width of them in the row direction is the width of a single sub-pixel 11. Therefore, with reference to FIG. 3 to FIG. 6 together, FIG. 3 is view units corresponding to the first view, FIG. 4 is the positions occluded by the raster 20 when the first view is displayed, FIG. 5 is view units corresponding to the second view, and FIG. 6 is the positions occluded by the raster 20 when the second view is displayed. It may be seen from FIG. 3 to FIG. 6 that, when the first view and the second view are displayed, the occluding rectangles 21 in the raster 20 occlude part of the displayed sub-pixels 11. With respect to the problem in the invention that color cast is formed due to half of the sub-pixels 11 being occluded by the raster 20, the invention may suitably solve the color cast problem by designing an algorithm and re-designing sampling regions. For the specifics, reference is made to a driving method for a 3D display device of the invention.

Figure 16:
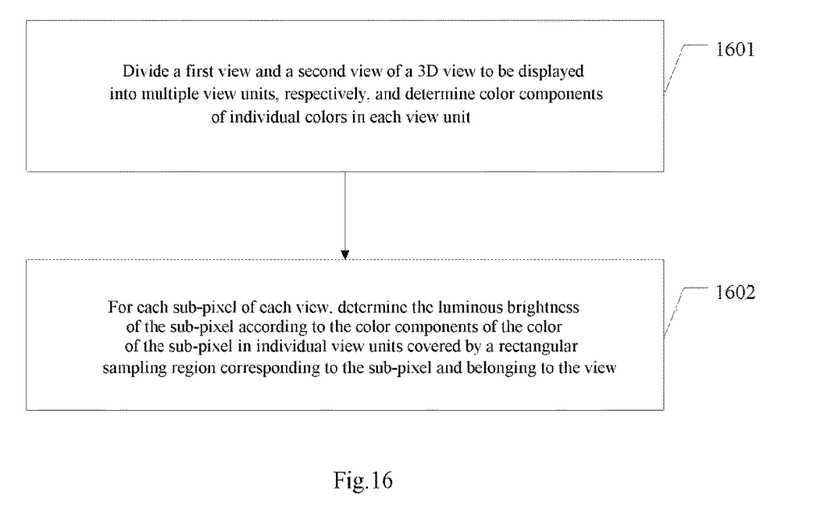
FIG. 16 is a flow chart of a driving method for driving a 3D display device provided by an embodiment of the invention.

An embodiment of the invention further provides a driving method for a 3D display device, which 3D display device is a 3D display device as claimed in any of the above, the method comprising: which is shown later at 1601 in FIG. 16, and for each sub-pixel 11 of each view, determining the luminous brightness of the sub-pixel 11 according to the color components of the color of the sub-pixel 11 in individual view units covered by a rectangular sampling region corresponding to the sub-pixel 11 and belonging to the view, which is shown at 1602 in FIG. 16.

The specific steps are as follows.

At step One, a first view and a second view of a 3D view to be displayed are divided into multiple view units, respectively, and color components of individual colors in each view unit are determined.

In particular, M sub-pixels in the 3D display device correspond to a view unit, wherein M is 3. At the above step, the first view may be divided into multiple view units based on the number of pixels of the 3D display device which can be achieved theoretically. In an embodiment of the invention, 3 sub-pixels are taken as a theoretical pixel unit, and a theoretical pixel unit in the embodiment of the invention corresponds to the foregoing view unit, which may be a first view unit, and alternatively a second view unit. Afterwards, color components occupied by red, green and blue in an individual theoretical pixel unit are determined. In the same way, multiple theoretical pixel units corresponding to the second view and color components occupied by red, green and blue in an individual theoretical pixel unit are obtained. In particular, the left and right eye views (i.e., the first and second views) may be divided according to the visual resolution of the screen, respectively.

At step Two, for each sub-pixel 11 of each view, the luminous brightness of the sub-pixel 11 is determined according to the color components of the color of the sub-pixel 11 in individual theoretical pixel units covered by a rectangular sampling region corresponding to the sub-pixel 11 and belonging to the view.

Therein, for each sub-pixel, the overlapping area of its corresponding rectangular sampling region and each of the multiple theoretical pixel units and the color component corresponding to the color of the sub-pixel are determined, the product of the overlapping area corresponding to each theoretical pixel unit and the corresponding color component is determined, and the luminous brightness of the sub-pixel is determined according to the sum of individual products and the area of the sampling region. Of course, in a practical application, the luminous intensity of a corresponding sub-pixel may also be determined in other way after a rectangular region is used for sampling, which will not be described in detail any more in embodiments of the invention.

At the step Two, when designing the sampling region specifically, first the position of a sub-pixel 11 is judged, and when the sub-pixel 11 is not located in a joint region 22 of the occluding rectangles 21, the sampling region of the sub-pixel 11 is as follows.

The sampling region is a rectangular sampling region, the midline of the sampling region in the column direction is the midline of the corresponding sub-pixel 11 in the column direction, the width of the sampling region in the row direction is two times that of the sub-pixel 11 in the row direction, and its width in the column direction is three times that of the sub-pixel 11 in the column direction.

For sub-pixels 11 in even columns, the sampling region corresponding to each sub-pixel 11 covers a part of a sub-pixel 11 located under the sub-pixel 11 corresponding to the sampling region in the column direction.

For sub-pixels 11 in odd columns, the sampling region corresponding to each sub-pixel 11 joins the sampling region corresponding to a sub-pixel 11 in an even column, and the positions of the sampling region corresponding to the sub-pixel 11 in the odd column and the sampling region corresponding to the sub-pixel 11 in the even column are stagger.

Therein, for sub-pixels 11 in even columns, the sampling region corresponding to each sub-pixel 11 covers a part of a sub-pixel 11 located under the sub-pixel 11 corresponding to the sampling region in the column direction, which part is between 0 and 1/2 sub-pixel area.

Figure 7:
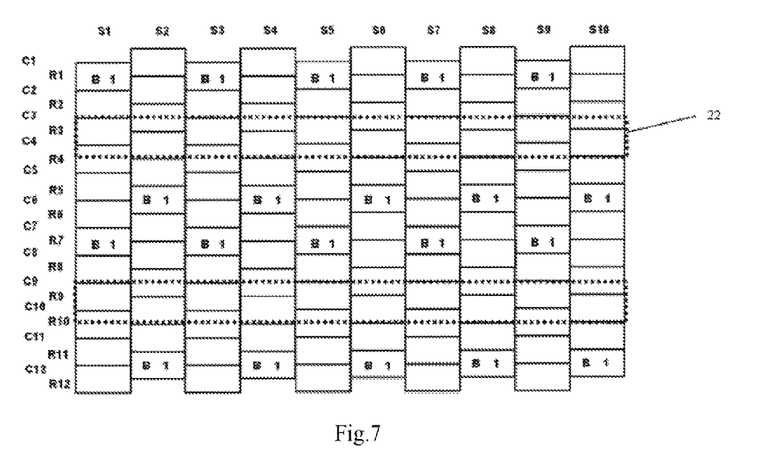
FIG. 7 is a schematic diagram of a distribution of blue sub-pixels corresponding to the first view provided by an embodiment of the invention.
Figure 8:
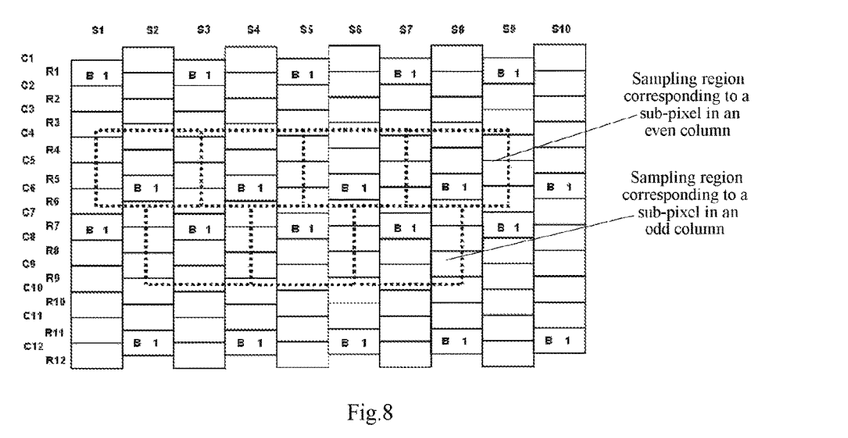
FIG. 8 is a schematic diagram of sampling regions corresponding to the blue sub-pixels corresponding to the first view provided by an embodiment of the invention.

For the convenience of understanding, in the following, reference is made to FIG. 7 to FIG. 10. FIG. 7 shows an arrangement manner of blue sub-pixels in theoretical pixel units corresponding to the first view, it may be seen that the blue sub-pixels do not fall within a joint region 22 and the sampling region needs no special considerations. FIG. 8 correspondingly provides a design of sampling regions corresponding to blue sub-pixels in theoretical pixel units corresponding to the first view. It may be seen from FIG. 8 that, in this application, a sampling region corresponding to a blue sub-pixel is a rectangular sampling region, and sampling regions corresponding to a sub-pixel 11 located in an odd column and corresponding to a sub-pixel 11 located in an even column join together. When set specifically, taking the blue sub-pixel S8C6 as an example, the four vertices of its corresponding sampling region are located in the sub-pixel S7R3, the sub-pixel S9R3, the sub-pixel S7R6 and the sub-pixel S9R6, respectively, and it may be seen from FIG. 8 that the sampling region covers a part of the sub-pixel located under the blue sub-pixel S8C6, and the covered part is less than ½ sub-pixel area. With respect to blue sub-pixels in an odd column, taking S7R7 as an example, the four vertices of its corresponding sampling region are located in the sub-pixel S6C7, the sub-pixel S8C7, the sub-pixel S6C10 and the sub-pixel S8C10, respectively, and as shown in FIG. 8, the positions of the sampling region corresponding to the blue sub-pixel S8C6 and the sampling region corresponding to the blue sub-pixel S7R7 are staggered by the width of one sub-pixel in the column direction, and the sampling region corresponding to the blue sub-pixel S8C6 and the sampling region corresponding to the blue sub-pixel S7R7 join in the column direction.

Figure 9:
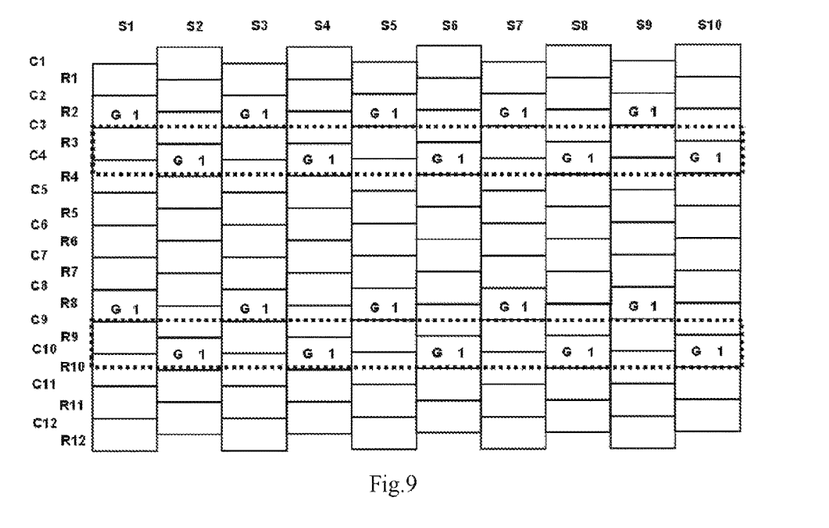
FIG. 9 is a schematic diagram of a distribution of green sub-pixels corresponding to the first view provided by an embodiment of the invention.
Figure 10:
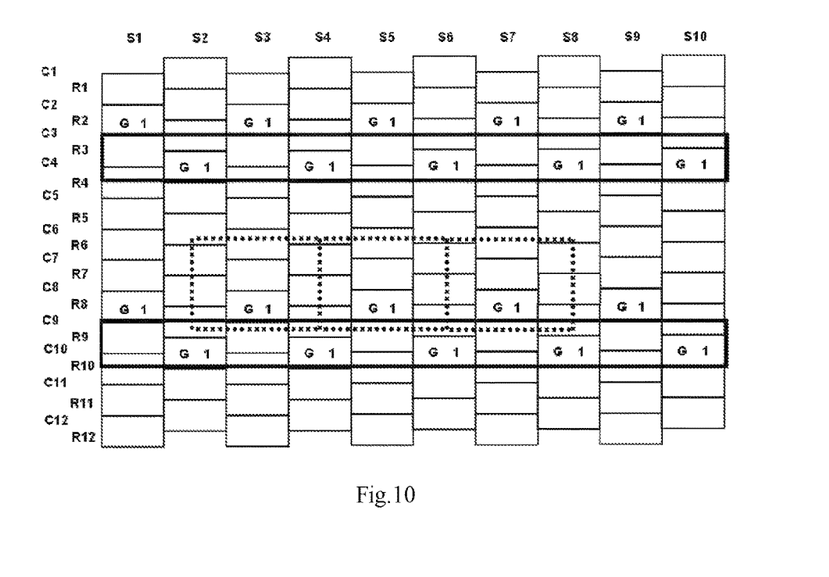
FIG. 10 is a schematic diagram of sampling regions corresponding to the green sub-pixels corresponding to the first view provided by an embodiment of the invention.

With reference to FIG. 9 and FIG. 10, FIG. 9 shows a distribution of green sub-pixels, and FIG. 10 provides forms of sampling regions corresponding to green sub-pixels. It may be seen from FIG. 9 that green sub-pixels located in odd columns are located outside joint regions, and the design of their corresponding sampling regions is the same as that of the sampling regions of the blue sub-pixels, whereas green sub-pixels located in even columns are located in joint regions 22, and the design of their sampling regions is different from that of the sampling regions of the blue sub-pixels.

With respect to green sub-pixels located in odd columns, reference is made to FIG. 9 and FIG. 10. For the convenience of understanding, taking the green sub-pixel S3R8 as an example for description, since it is not located in a joint region 22, the four vertices of its corresponding sampling region are located in the sub-pixel S2C6, the sub-pixel S4C6, the sub-pixel S2C9 and the sub-pixel S4C9, respectively, and it may be seen from FIG. 10 that the sampling region corresponding to the green sub-pixel S3R8 contains a part of the sub-pixel S3R9, and the part of the sub-pixel is less than ½ area of the green sub-pixel.

Figure 11:
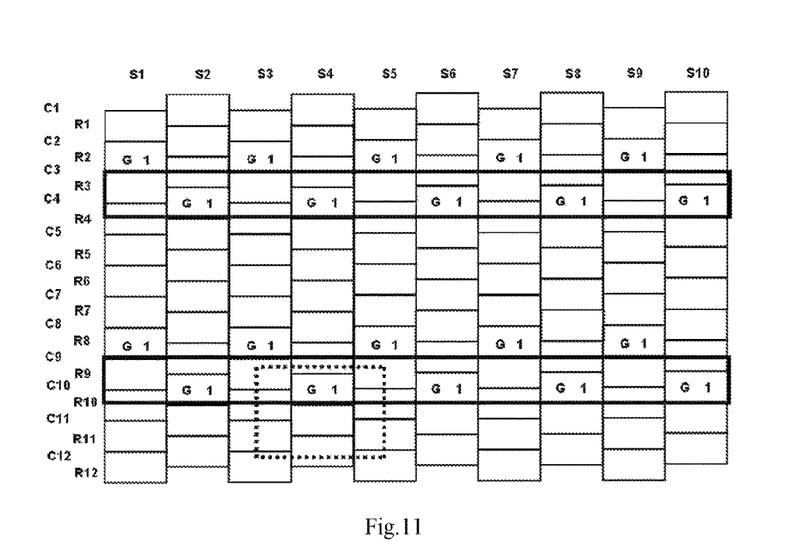
FIG. 11 is a sampling region corresponding to green sub-pixels located in a joint region of occluding rectangles in the first view provided by an embodiment of the invention.
Figure 12:
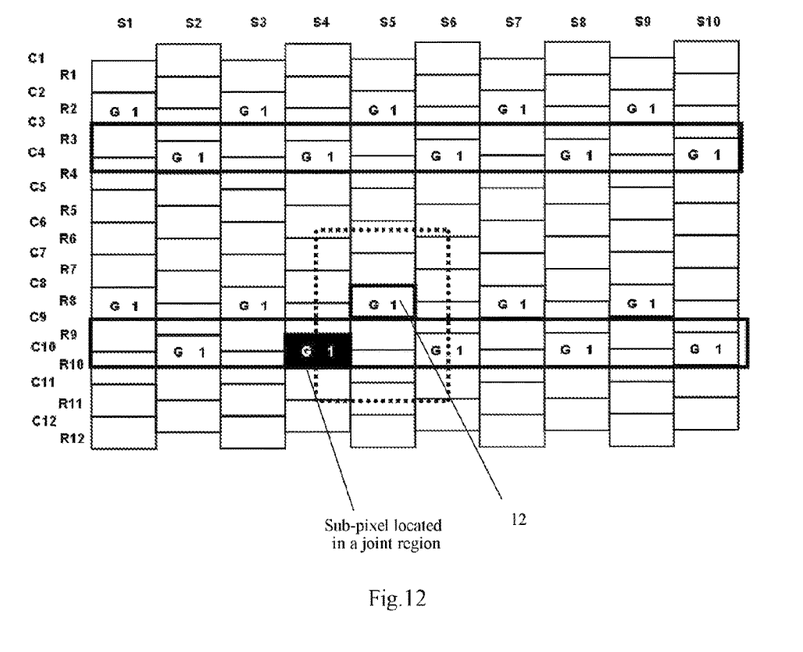
FIG. 12 is a sampling region corresponding to alternative pixels of green sub-pixels located in a joint region of occluding rectangles in the first view provided by an embodiment of the invention.

With respect to green sub-pixels located in even columns, reference is made to FIG. 9, FIG. 11 and FIG. 12 together. It may be seen from FIG. 9 that the green sub-pixels located in the even columns are located in joint regions 22, and when a sub-pixel located in a joint region of occluding rectangles is displayed, it is replaced with a sub-pixel in a neighboring column of sub-pixel groups for display, which is located outside the joint region of occluding rectangles, closest to it, used for displaying the same view as it and has the same color as it. In particular, in a column of sub-pixels neighboring to the sub-pixel located in the joint region of occluding rectangles, sub-pixels are sought which are located outside the joint region of occluding rectangles, display the same view and have the same color as the sub-pixel; in the found sub-pixels, a sub-pixel closest to the sub-pixel located in the joint region of occluding rectangles is used as an alternative sub-pixel, and a sampling region is divided out according to the position of the alternative sub-pixel; the sampling region is a rectangular region, of which the width in the column direction is between 5 times and 6 times the width of the sub-pixel in the column direction, and of which the width in the row direction is 2 times the width of the sub-pixel in the row direction; and in the column direction, both the upper and lower ends of the sampling region corresponding to the alternative sub-pixel cover part of a sub-pixel.

For the convenience of description, taking the green sub-pixel S4C10 as an example for description, if the above design of a sampling region is followed, its corresponding sampling region is as shown in FIG. 11, and the four vertices of its corresponding sampling region are located in the sub-pixel S3R9, the sub-pixel S5R9, the sub-pixel S3R12 and the sub-pixel S5R12, respectively. However, a sub-pixel in the sampling region cannot be fully displayed due to being occluded by the raster. Therefore, in this embodiment, for a sub-pixel located in a joint region, its corresponding sampling region is as shown in FIG. 12. The green sub-pixel S4C10 is still taken as an example for description. It can be seen from FIG. 12 that the sub-pixel at the position of S4C10 is turned off, namely, is not displayed, and meanwhile, it needs to conduct compensation by means of display by S5R8. However, at this point, the sampling region of S5R8 can not correspond to the previous one, and therefore, the sampling region of S5R8 is re-designed. In particular, as shown in FIG. 12, the four vertices of the rectangular sampling region are located in the sub-pixel S4C6, the sub-pixel S6C6, the sub-pixel S4C11 and the sub-pixel S6C11, respectively.

Figure 13:
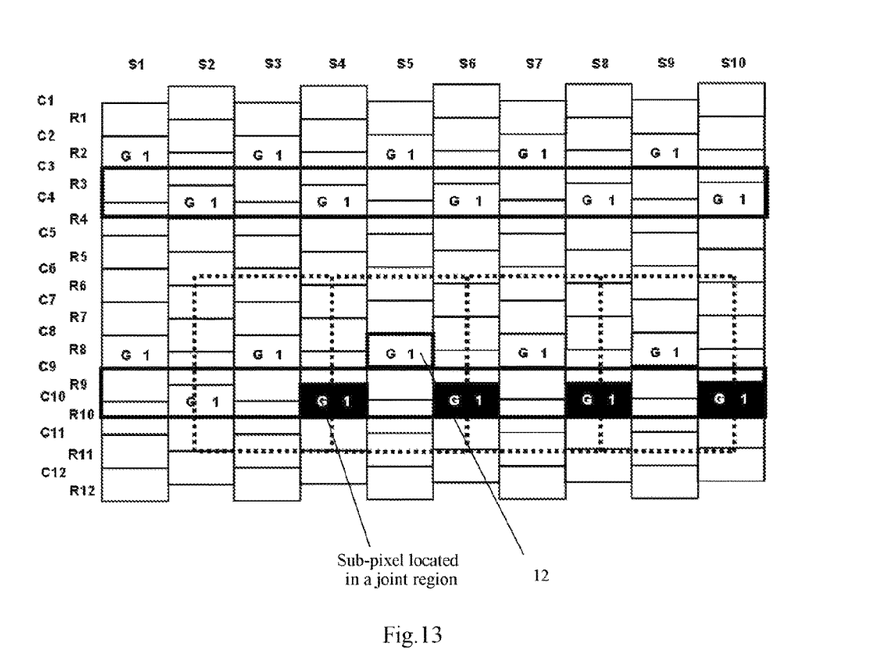
FIG. 13 is sampling regions corresponding to alternative pixels of green sub-pixels located in a joint region of occluding rectangles in different columns in the first view provided by an embodiment of the invention.

Reference is made to FIG. 12 and FIG. 13 together, wherein FIG. 12 shows an example in which a sub-pixel in a column of sub-pixel groups on the right of a green sub-pixel located in a joint region 22 is taken as an alternative pixel 12, while FIG. 13 shows an example in which sub-pixels in columns of sub-pixel groups on the left of successive four green sub-pixels located in a joint region 22 are taken as alternative pixels 12. In particular, for the convenience of description, the green sub-pixel S4C10 is taken as an example. In FIG. 13, its alternative sub-pixel is the green sub-pixel S3R8, and the four vertices of its corresponding sampling region are located in the sub-pixel S2C6, the sub-pixel S4C6, the sub-pixel S2C11 and the sub-pixel S4C11, respectively.

Figure 14:
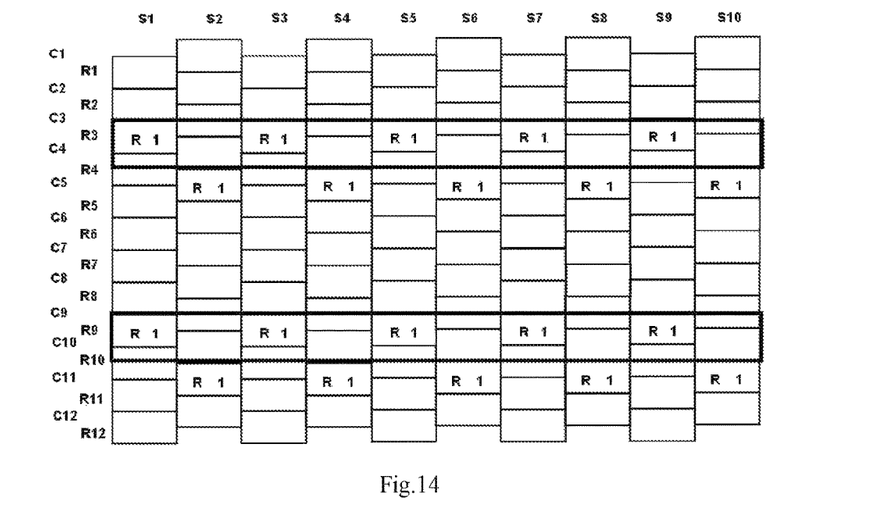
FIG. 14 is a schematic diagram of a distribution of red sub-pixels corresponding to the first view provided by an embodiment of the invention.
Figure 15:
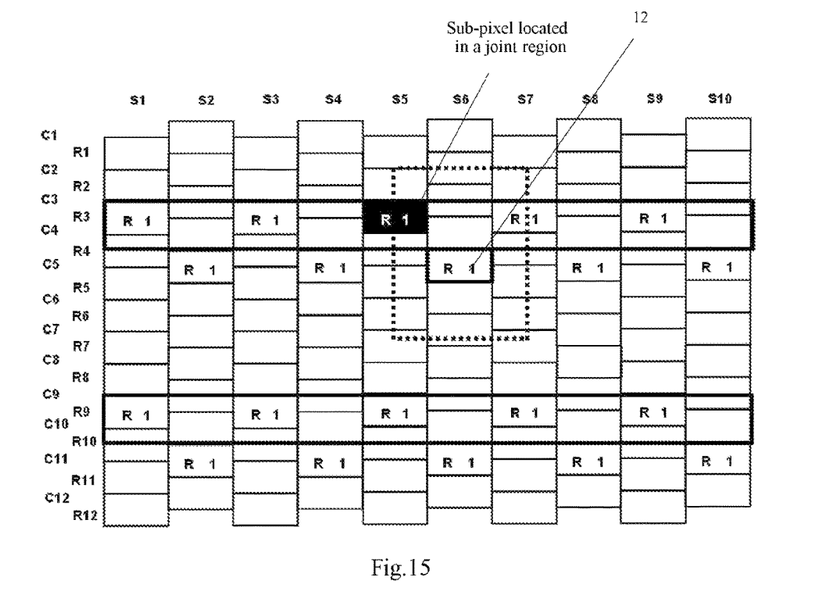
FIG. 15 is a sampling region corresponding to alternative pixels of red sub-pixels located in a joint region of occluding rectangles in different columns in the first view provided by an embodiment of the invention.

Likewise, reference is made to FIG. 14 and FIG. 15 together. FIG. 14 shows a schematic diagram of a distribution of red sub-pixels. It can be seen from FIG. 14 that red sub-pixels in odd columns are located in joint regions, and red sub-pixels in even columns are located outside joint regions. For a red sub-pixel in an even column, the design of its sampling region is the same as that of the sampling regions of the blue sub-pixel and the green sub-pixel described above, and will not be repeated here. For a red sub-pixel located in a joint region 22, the design of its sampling region is as shown in FIG. 15. For a red sub-pixel located in a joint region, a red sub-pixel closest to it and located in a column of sub-pixels on the right of it is taken as an alternative pixel 12 for the design of its sampling region. For the convenience of description, the red sub-pixel S5R3 is taken as an example for illustration. It is located in a joint region 22. In a specific display, the red sub-pixel S5R3 is turned off and replaced with the red sub-pixel S6C5, the design of the sampling region corresponding thereto is a rectangular sampling region, and the four vertices of the rectangular sampling region are located in the sub-pixel S5C2, the sub-pixel S7C2, the sub-pixel S5C7 and the sub-pixel S7C7, respectively.

Figure 17:
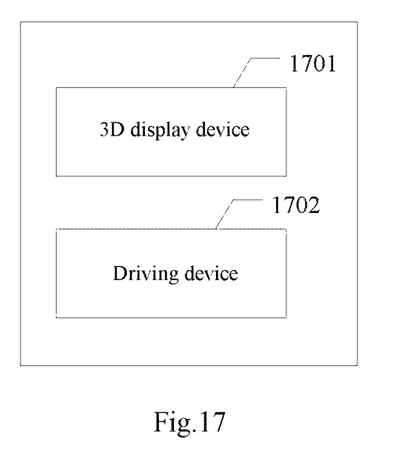
FIG. 17 is a block diagram of a 3D display system provided by an embodiment of the invention.

An embodiment of the invention further provides a driving device for a 3D display device, which is shown at 1702 in FIG. 17 and which is configured to perform the driving method as described above.

An embodiment of the invention further provides a 3D display system. Referring to FIG. 17, it comprises a 3D display device 1701 according to an embodiment of the invention and a driving device 1702 thereof according to an embodiment of the invention.

It can be seen from the above description that by the design of an algorithm, turn-on point positions of sub-pixels 11 and a corresponding relationship between sampling regions and 3D view signals are controlled flexibly, and utilization of such a method of combing the virtual display and 3D may increase the visual resolution of an inserted view, thereby improving the 3D virtual display resolution and enhancing the 3D display effect.

Clearly, various changes and variations may be made by the person having ordinary skill in the art without departing from the spirit and scope of the invention. As such, the invention is also intended to encompass such changes and variations if the changes and variations of the invention pertain to the scope of the claims and the equivalents thereof.

What is claimed is:

1. A 3D display device comprising a pixel array and a raster, the pixel array comprising multiple columns of sub-pixel groups, each column of sub-pixel groups comprises M*N sub-pixels, wherein M is the number of color categories of the sub-pixels, and N is a positive integer greater than 3, wherein each sub-pixel has a rectangular shape, and the odd columns of sub-pixel groups and the even columns of sub-pixel groups are set staggerly;

the raster comprising multiple occluding rectangles arranged in a regular array, each occluding rectangle is used for occluding at least one sub-pixel in the column direction, wherein occluding rectangles in neighboring columns are set staggerly in the column direction, and occluding rectangles in columns separated by a column are symmetrically set relative to the column between them in the row direction, wherein the width with which the odd columns of sub-pixel groups and the even columns of sub-pixel groups are set staggerly is half the width of the sub-pixels in the column direction;

and the width with which occluding rectangles in neighboring columns are set staggerly in the column direction is half the width of the sub-pixels in the column direction, wherein the width of the occluding rectangles in the column direction is 7/2 times the width of the sub-pixel units in the column direction, and the width of the occluding rectangles in the row direction is the width of a single sub-pixel, wherein in each column of sub-pixel groups, every M sub-pixels are a view unit sequentially from the beginning, and neighboring view units correspond to different views in the 3D display.

2. The 3D display device as claimed in claim 1, wherein M is 3, and the colors of the sub-pixels are red, green and blue.

3. The 3D display device as claimed in claim 2, wherein the pixel array is a triangle array.

4. A driving method for a 3D display device, wherein the display device comprises a pixel array and a raster, wherein the pixel array comprises multiple columns of sub-pixel groups, each column of sub-pixel groups comprises M*N sub-pixels, wherein M is the number of color categories of the sub-pixels, and N is a positive integer greater than 3, wherein each sub-pixel has a rectangular shape, and the odd columns of sub-pixel groups and the even columns of sub-pixel groups are set staggerly;

wherein the raster comprising multiple occluding rectangles arranged in a regular array, each occluding rectangle is used for occluding at least one sub-pixel in the column direction, wherein occluding rectangles in neighboring columns are set staggerly in the column direction, and occluding rectangles in columns separated by a column are symmetrically set relative to the column between them in the row direction, wherein the width with which the odd columns of sub-pixel groups and the even columns of sub-pixel groups are set staggerly is half the width of the sub-pixels in the column direction;

and the width with which occluding rectangles in neighboring columns are set staggerly in the column direction is half the width of the sub-pixels in the column direction, wherein the width of the occluding rectangles in the column direction is 7/2 times the width of the sub-pixel units in the column direction, and the width of the occluding rectangles in the row direction is the width of a single sub-pixel, wherein in each column of sub-pixel groups, every M sub-pixels are a view unit sequentially from the beginning, and neighboring view units correspond to different views in the 3D display;

the method comprising:

dividing a first view and a second view of a 3D view to be displayed into multiple view units, respectively, and determining color components of individual colors in each view unit; and for each sub-pixel of each view, determining the luminous brightness of the sub-pixel according to the color components of the color of the sub-pixel in individual view units covered by a rectangular sampling region corresponding to the sub-pixel and belonging to the view;

wherein when a sub-pixel located in a region where occluding rectangles are overlapped in the column direction is displayed, it is replaced with a sub-pixel in a neighboring column of sub-pixel groups for display, which is located outside the region where occluding rectangles are overlapped in the column direction, closest to it, used for displaying the same view as it and has the same color as it.

5. The driving method as claimed in claim 4, wherein when a sub-pixel which is not located in a region where occluding rectangles are overlapped in the column direction is displayed, the sampling region is a rectangular sampling region, the sampling region takes the centerline of the corresponding sub-pixel in the column direction as the centerline of the sampling region in the column direction, the width of the sampling region in the row direction is two times the width of the sub-pixel in the row direction, and the width of the sampling region in the column direction is three times that of the sub-pixel in the column direction; wherein for sub-pixels in even columns, the sampling region corresponding to each sub-pixel covers a part of a sub-pixel located under the sub-pixel corresponding to the sampling region in the column direction; and for sub-pixels in odd columns, the sampling region corresponding to each sub-pixel joins the sampling region corresponding to a sub-pixel in an even column in the column direction, and the positions of the sampling region corresponding to the sub-pixel in the odd column and the sampling region corresponding to the sub-pixel in the even column are stagger in the row direction.

6. The driving method as claimed in claim 5, wherein for sub-pixels in even columns, the sampling region corresponding to each sub-pixel covers a part of a sub-pixel located under the sub-pixel corresponding to the sampling region in the column direction, the length of the part covered is between 0 and 1/2 times the length of the sub-pixel in the column direction.

7. The driving method as claimed in claim 4, further comprising:

in a column of sub-pixels neighboring to the sub-pixel located in the region where occluding rectangles are overlapped in the column direction, seeking sub-pixels which are located outside the region where occluding rectangles are overlapped in the column direction, display the same view and have the same color as the sub-pixel; in the found sub-pixels, using a sub-pixel closest to the sub-pixel located in the region where occluding rectangles are overlapped in the column direction as an alternative sub-pixel, and dividing out a sampling region according to the position of the alternative sub-pixel, wherein the sampling region is a rectangular region, the width of the rectangular region in the column direction is between 5 times and 6 times the width of the sub-pixel in the column direction, and the width of the rectangular region in the row direction is 2 times the width of the sub-pixel in the row direction, and in the column direction, both the upper and lower ends of the sampling region corresponding to the alternative sub-pixel cover part of a sub-pixel.

8. A driving device for a 3D display device, wherein the 3D display device comprises a pixel array and a raster, and the driving device is configured to perform a method comprising:

dividing a first view and a second view of a 3D view to be displayed into multiple view units, respectively, and determining color components of individual colors in each view unit; and for each sub-pixel of each view, determining the luminous brightness of the sub-pixel according to the color components of the color of the sub-pixel in individual view units covered by a rectangular sampling region corresponding to the sub-pixel and belonging to the view;

wherein when a sub-pixel located in a region where occluding rectangles are overlapped in the column direction is displayed, it is replaced with a sub-pixel in a neighboring column of sub-pixel groups for display, which is located outside the region where occluding rectangles are overlapped in the column direction, closest to it, used for displaying the same view as it and has the same color as it;

wherein the pixel array comprises multiple columns of sub-pixel groups, each column of sub-pixel groups comprises M*N sub-pixels, wherein M is the number of color categories of the sub-pixels, and N is a positive integer greater than 3, wherein each sub-pixel has a rectangular shape, and the odd columns of sub-pixel groups and the even columns of sub-pixel groups are set staggerly;

wherein the raster comprises multiple occluding rectangles arranged in a regular array, each occluding rectangle is used for occluding at least one sub-pixel in the column direction, wherein occluding rectangles in neighboring columns are set staggerly in the column direction, and occluding rectangles in columns separated by a column are symmetrically set relative to the column between them in the row direction.

9. A 3D display system comprising a 3D display device and a driving device according to claim 8, wherein the 3D display device comprises a pixel array and a raster, wherein the pixel array comprises multiple columns of sub-pixel groups, each column of sub-pixel groups comprises M*N sub-pixels, wherein M is the number of color categories of the sub-pixels, and N is a positive integer greater than 3, wherein each sub-pixel has a rectangular shape, and the odd columns of sub-pixel groups and the even columns of sub-pixel groups are set staggerly;

wherein the raster comprises multiple occluding rectangles arranged in a regular array, each occluding rectangle is used for occluding at least one sub-pixel in the column direction, wherein occluding rectangles in neighboring columns are set staggerly in the column direction, and occluding rectangles in columns separated by a column are symmetrically set relative to the column between them in the row direction.

10. The driving device as claimed in claim 8, wherein the driving device is further configured to perform a driving method for a 3D display device, the method comprising:
dividing a first view and a second view of a 3D view to be displayed into multiple view units, respectively, and determining color components of individual colors in each view unit; and
for each sub-pixel of each view, determining the luminous brightness of the sub-pixel according to the color components of the color of the sub-pixel in individual view units covered by a rectangular sampling region corresponding to the sub-pixel and belonging to the view,
wherein when a sub-pixel located in a region where occluding rectangles are overlapped in the column direction is displayed, it is replaced with a sub-pixel in a neighboring column of sub-pixel groups for display, which is located outside the region where occluding rectangles are overlapped in the column direction, closest to it, used for displaying the same view as it and has the same color as it.

11. The driving device as claimed in claim 8, wherein the driving device is further configured to perform a driving method for a 3D display device, the method comprising:
dividing a first view and a second view of a 3D view to be displayed into multiple view units, respectively, and determining color components of individual colors in each view unit; and
for each sub-pixel of each view, determining the luminous brightness of the sub-pixel according to the color components of the color of the sub-pixel in individual view units covered by a rectangular sampling region corresponding to the sub-pixel and belonging to the view
wherein when a sub-pixel which is not located in a region where occluding rectangles are overlapped in the column direction is displayed, the sampling region is a rectangular sampling region, the sampling region takes the centerline of the corresponding sub-pixel in the column direction as the centerline of the sampling region in the column direction, the width of the sampling region in the row direction is two times the width of the sub-pixel in the row direction, and the width of the sampling region in the column direction is three times that of the sub-pixel in the column direction; wherein
for sub-pixels in even columns, the sampling region corresponding to each sub-pixel covers a part of a sub-pixel located under the sub-pixel corresponding to the sampling region in the column direction; and
for sub-pixels in odd columns, the sampling region corresponding to each sub-pixel joins the sampling region corresponding to a sub-pixel in an even column in the column direction, and the positions of the sampling region corresponding to the sub-pixel in the odd column and the sampling region corresponding to the sub-pixel in the even column are stagger in the row direction.

12. The driving device as claimed in claim 8, wherein the driving device is further configured to perform a driving method for a 3D display device, the method comprising:
dividing a first view and a second view of a 3D view to be displayed into multiple view units, respectively, and determining color components of individual colors in each view unit; and
for each sub-pixel of each view, determining the luminous brightness of the sub-pixel according to the color components of the color of the sub-pixel in individual view units covered by a rectangular sampling region corresponding to the sub-pixel and belonging to the view
wherein when a sub-pixel which is not located in a region where occluding rectangles are overlapped in the column direction is displayed, the sampling region is a rectangular sampling region, the sampling region takes the centerline of the corresponding sub-pixel in the column direction as the centerline of the sampling region in the column direction, the width of the sampling region in the row direction is two times the width of the sub-pixel in the row direction, and the width of the sampling region in the column direction is three times that of the sub-pixel in the column direction; wherein
for sub-pixels in even columns, the sampling region corresponding to each sub-pixel covers a part of a sub-pixel located under the sub-pixel corresponding to the sampling region in the column direction; and
for sub-pixels in odd columns, the sampling region corresponding to each sub-pixel joins the sampling region corresponding to a sub-pixel in an even column in the column direction, and the positions of the sampling region corresponding to the sub-pixel in the odd column and the sampling region corresponding to the sub-pixel in the even column are stagger in the row direction
wherein for sub-pixels in even columns, the sampling region corresponding to each sub-pixel covers a part of a sub-pixel located under the sub-pixel corresponding to the sampling region in the column direction, the length of the part covered is between 0 and 1/2 times the length of the sub-pixel in the column direction.

13. The driving device as claimed in claim 8, wherein the driving device is further configured to perform a driving method for a 3D display device, the display device being the 3D display device comprising a pixel array and a raster, the pixel array comprising multiple columns of sub-pixel groups, each column of sub-pixel groups comprises M*N sub-pixels, wherein M is the number of color categories of the sub-pixels, and N is a positive integer greater than 3, wherein each sub-pixel has a rectangular shape, and the odd columns of sub-pixel groups and the even columns of sub-pixel groups are set staggerly;
the raster comprising multiple occluding rectangles arranged in a regular array, each occluding rectangle is used for occluding at least one sub-pixel in the column direction, wherein occluding rectangles in neighboring columns are set staggerly in the column direction, and occluding rectangles in columns separated by a column are symmetrically set relative to the column between them in the row direction wherein the driving method for the 3D display device comprises:

dividing a first view and a second view of a 3D view to be displayed into multiple view units, respectively, and determining color components of individual colors in each view unit; and for each sub-pixel of each view, determining the luminous brightness of the sub-pixel according to the color components of the color of the sub-pixel in individual view units covered by a rectangular sampling region corresponding to the sub-pixel and belonging to the view;

wherein when a sub-pixel located in a region where occluding rectangles are overlapped in the column direction is displayed, it is replaced with a sub-pixel in a neighboring column of sub-pixel groups for display, which is located outside the region where occluding rectangles are overlapped in the column direction, closest to it, used for displaying the same view as it and has the same color as it;

driving method further comprising: in a column of sub-pixels neighboring to the sub-pixel located in the region where occluding rectangles are overlapped in the column direction, seeking sub-pixels which are located outside the region where occluding rectangles are overlapped in the column direction, display the same view and have the same color as the sub-pixel; in the found sub-pixels, using a sub-pixel closest to the sub-pixel located in the region where occluding rectangles are overlapped in the column direction as an alternative sub-pixel, and dividing out a sampling region according to the position of the alternative sub-pixel, wherein the sampling region is a rectangular region, the width of the rectangular region in the column direction is between 5 times and 6 times the width of the sub-pixel in the column direction, and the width of the rectangular region in the row direction is 2 times the width of the sub-pixel in the row direction, and in the column direction, both the upper and lower ends of the sampling region corresponding to the alternative sub-pixel cover part of a sub-pixel.

* * * * *